(12) United States Patent
Irwin et al.

(10) Patent No.: US 9,135,642 B1
(45) Date of Patent: Sep. 15, 2015

(54) SYSTEM AND METHOD FOR DEVICE-BASED ECARE

(75) Inventors: Scott A. Irwin, Winter Springs, FL (US);
Robert D. Birch, Orlando, FL (US);
Joseph P. Lupo, Apopka, FL (US);
Sanjiv Karani, Mason, OH (US);
Stephen D. Weagraff, Orlando, FL (US)

(73) Assignee: NetCracker Technology Solutions, Inc., Cincinnati, OH (US)

( * ) Notice: Subject to any disclaimer, the term of this patent is extended or adjusted under 35 U.S.C. 154(b) by 200 days.

(21) Appl. No.: 12/856,271

(22) Filed: Aug. 13, 2010

Related U.S. Application Data

(63) Continuation of application No. 11/044,848, filed on Jan. 27, 2005, now abandoned.

(60) Provisional application No. 60/540,855, filed on Jan. 29, 2004, provisional application No. 60/550,556, filed on Mar. 5, 2004.

(51) Int. Cl.
*G06Q 30/00* (2012.01)
*G06Q 30/02* (2012.01)

(52) U.S. Cl.
CPC ................................. *G06Q 30/0256* (2013.01)

(58) Field of Classification Search
CPC ...................... G06Q 30/0255; G06Q 30/0256
See application file for complete search history.

(56) References Cited

U.S. PATENT DOCUMENTS

| | | | |
|---|---|---|---|
| 5,204,968 A * | 4/1993 | Parthasarathi | ................ 715/707 |
| 5,944,839 A | 8/1999 | Isenberg | |
| 5,983,364 A | 11/1999 | Bortcosh et al. | |
| 6,145,096 A | 11/2000 | Bereiter et al. | |
| 6,389,426 B1 * | 5/2002 | Turnbull et al. | .............. 707/661 |
| 6,542,897 B2 | 4/2003 | Lee | |
| 6,564,227 B2 | 5/2003 | Sakakibara et al. | |
| 6,697,894 B1 | 2/2004 | Mitchell et al. | |
| 6,742,141 B1 * | 5/2004 | Miller | ............................ 714/26 |
| 6,965,868 B1 | 11/2005 | Bednarek | |

(Continued)

OTHER PUBLICATIONS

M-Business Anywhere Technical Whitepaper, iAnywhere Solutions, Inc., http://www.ianywhere.com/whitepapers/mbus_anywhere_tech_ov.html (2004).

(Continued)

*Primary Examiner* — Kira Nguyen
(74) *Attorney, Agent, or Firm* — Foley & Lardner LLP

(57) ABSTRACT

There is disclosed a device-based eCare solution that facilitates computerized consumer service on consumer devices. The system may include an end device, a back-end server eCare system, and a communications technology. One or more consumer eCare applications, such as balance and pricing applications, consumer assistance applications, diagnostic applications, and anticipatory applications, may be resident on the device. The end device may be configured to monitor the consumer's activity and collect and store a set of data regarding the consumer's activity. The end device may be further programmed to proactively offer the consumer a consumer eCare application based on the set of data and execute the consumer eCare application in accordance with the consumer's instructions. The system may create a collaborative environment between the device, other devices, and the back-end server eCare system. The device may intermittently communicate with other devices, the back-end server eCare system, or both, to synchronize information.

11 Claims, 5 Drawing Sheets

(56) References Cited

U.S. PATENT DOCUMENTS

| | | | |
|---|---|---|---|
| 6,999,990 B1* | 2/2006 | Sullivan et al. | 709/205 |
| 7,283,846 B2 | 10/2007 | Spriestersbach et al. | |
| 7,506,257 B1* | 3/2009 | Chavez et al. | 715/714 |
| 2003/0056140 A1* | 3/2003 | Taylor et al. | 714/4 |
| 2003/0061546 A1* | 3/2003 | Collins et al. | 714/42 |
| 2003/0126316 A1* | 7/2003 | Parker | 710/15 |
| 2003/0187672 A1* | 10/2003 | Gibson et al. | 705/1 |
| 2003/0216936 A1 | 11/2003 | Saitoh et al. | |
| 2004/0199426 A1 | 10/2004 | Prorock | |
| 2004/0201611 A1 | 10/2004 | Bagsby | |
| 2004/0235413 A1 | 11/2004 | Min et al. | |
| 2005/0114301 A1 | 5/2005 | Jokinen et al. | |
| 2006/0143022 A1 | 6/2006 | Bird et al. | |

OTHER PUBLICATIONS

Office Action dated Sep. 8, 2005 for U.S. Appl. No. 11/011,720.
Office Action dated Feb. 22, 2006 for U.S. Appl. No. 11/011,720.
Office Action dated Jul. 11, 2006 for U.S. Appl. No. 11/011,720.
Office Action dated Oct. 22, 2007 for U.S. Appl. No. 10/419,463.
Office Action dated Nov. 1, 2007 for U.S. Appl. No. 10/392,496.
Office Action dated Jun. 13, 2008 for U.S. Appl. No. 10/419,463.
Office Action dated Oct. 28, 2008 for U.S. Appl. No. 10/392 496.
U.S. Appl. No. 10/392,496, filed Mar. 20, 2003, Irwin et al.
U.S. Appl. No. 10/419,463, filed Apr. 21, 2003, Wright.
U.S. Appl. No. 11/011,720, filed Dec. 14, 2004, Birch et al.
U.S. Appl. No. 11/749,983, filed May 17, 2007, Birch et al.
Office Action dated Mar. 24, 2009 for U.S. Appl. No. 10/419,463.
Office Action dated Apr. 27, 2009 for U.S. Appl. No. 10/392,496.
Office Action dated Jul. 24, 2009 for U.S. Appl. No. 11/749,983.
Office Action dated Mar. 25, 2010 for U.S. Appl. No. 11/418,751.
Office Action dated Jun. 23, 2010 for U.S. Appl. No. 10/392,496.
Office Action dated Jul. 22, 2010 for U.S. Appl. No. 11/749,983.

* cited by examiner

SYSTEM AND METHOD FOR DEVICE-BASED ECARE

This non-provisional patent application is a continuation of, and claims priority from, U.S. non-provisional application Ser. No. 11/044,848, filed on Jan. 27, 2005, which itself claims the benefit of Provisional Application No. 60/540,855, filed on Jan. 29, 2004, and U.S. Provisional Application No. 60/550,556, filed on Mar. 5, 2004. Each of the applications identified above is incorporated by reference herein.

BACKGROUND OF THE INVENTION

This invention is in the field of electronic consumer care ("eCare") solutions and particularly the utilization of devices to provide consumer care.

Currently, consumer care is provided via server-based systems. Various modes of interfaces are supported, including web sites, call center representatives, and telephony-based systems, as well as natural language-based interfaces. All of these systems use a client-server model, wherein most of the processing occurs in a back-end system.

Generally, care providers have attacked this problem by providing self-care web sites and interactive voice response (IVR) systems. While these systems may solve some of the problems associated with a server-based system, issues still remain with respect to end consumer convenience, usability, and back-end system information. Consumer care may be inconvenient because the end consumer may be required to change the access channel to obtain care. For example, a consumer experiencing a problem with a mobile phone may have to go to a personal computer (PC) to obtain a care solution. Additionally, in existing systems, consumer care may be difficult to obtain due to poor usability. For instance, web sites often present too much information with awkward navigation, thus requiring consumers to have a defined substantial need to navigate to the appropriate care solution. IVR systems, specifically, natural language-enabled systems, may be easier to use, however, they still do not lend themselves to frequent requests for small pieces of information. Further, in certain systems, the information the end consumer needs is either already on a consumer device or could be made available on such a device.

Currently, up to twenty percent (20%) of incoming calls service providers receive from subscribers are general inquiry calls. In fact, for balance limited/prepay subscribers, these general inquiry calls may comprise up to fifty percent (50%) of all the interactions with these subscribers. These general inquiry calls occupy incoming call bandwidth, increase hold times, drive up call abandonment due to lengthy hold times, drive down consumer satisfaction metrics, and take up valuable care representative time. The ability to perform these functions on the device itself would reduce these costs and increase consumer satisfaction.

SUMMARY OF THE INVENTION

Embodiments of this invention may move the care processing from a centralized model to a peer-to-peer based model, in which a consumer device may host certain aspects of the care processing. This care system can be deployed across a wide variety of consumer devices including, but not limited to, mobile phones, personal digital assistants (PDAs), personal computers (PCs), set-top boxes, game consoles, cameras, stationary phones, etc.

Consumer devices may provide consumers with flexible and convenient care options because they remain constant as consumers move from service to service and network to network. Further, consumer devices may enable self-care options because consumers may be able to access information directly on the device.

The eCare solution may include device-based agents and the capability for these agents to interact with back-end systems. The agents may operate autonomously, even when the consumer is not connected to the network, or, they may collaborate with a back-end eCare system or live agent to provide additional consumer care capabilities. The agents may be mobile agents, which may be software modules that move from host to host in a network. The agents may be downloaded onto the device from a server and may execute automated processes. The agents may, for example, automatically transmit a summary file to the consumer on the first day of the month. The consumer may then access the summary file through a consumer interface mechanism on the consumer device.

In addition, the agents may respond to external or internal events, such as a timer or any other event trigger. For example, the agents could monitor incoming data and alert the consumer when a certain event takes place, such as a consumer transaction or usage that causes the consumer to exceed the amount available in his or her account (i.e., exceeds the account balance). The agents may reference and/or utilize external or internal software routines that perform an action when a specified event occurs. The software routines may be computer executable instructions encoded on a computer readable medium that generate and send events to an eCare application.

One or more consumer eCare applications may be resident on the device. The eCare applications may be software programs designed to perform a function for the consumer. The eCare applications may receive events from software routines and infer the specific type and level of customer care required in response to those events. The eCare applications may use facilities and information available on the device itself or a back-end processing system to provide consumer eCare and enterprise eCare. In addition, they may include consumer interfaces for the eCare functions deployed on the device.

The device-hosted eCare applications may be any type of consumer eCare application, including, but not limited to, balance and pricing applications, reactive assistance applications (e.g., wizards or consumer help applications), diagnostic applications for the devices themselves (e.g., for networking difficulties, e-mail and web access problems, digital rights management problems, specific application problems, etc.), and anticipatory applications (e.g., eCare applications that monitor call patterns or application use and suggest changes). The device may also watch for and analyze other application specific behaviors and report the results to the consumer.

Embodiments of the invention may create a collaborative environment between one or more devices and back-end eCare systems. The device may be configured to communicate with another device and/or a centralized back-end eCare system to synchronize information. The communication may occur randomly in response to a trigger, or at designated intervals. Various configurable parameters may be specified within the eCare system, which may allow the system to dynamically determine when a connection should be attempted, or when a connection is required.

An embodiment of a system for providing computerized consumer care may include an end device that comprises at least one consumer care application, a back-end server system, and a communications technology. The end device may be programmed to monitor a consumer's activity, collect and store a set of context data that includes data regarding the consumer's activity, proactively offer the consumer a consumer care application based on the context data, and periodically connect to the back-end server system to synchronize information. In some embodiments, the back-end server system may execute the consumer care application and the end device may be further programmed to receive a consumer care solution from the back-end server system.

The context data may further include data related to the device activity, such as the physical location of the end device, network connectivity, state of the end device, configuration of the end device, memory allocations, battery power, network interfaces, processing capacity, operating system, history of events, device type details, applications, and combinations thereof. The end device may be further configured to adapt its offering of the consumer care application in accordance with the set of context data.

The system may further include a means for entering a consumer inquiry, wherein the end device is further programmed to execute the consumer care application in response to the inquiry. In some embodiments, the consumer care application may be a knowledge-based help application. In other embodiments, the consumer care application may be a balance application, a pricing application, a reactive application, a diagnostic application, an anticipatory application, or combinations thereof.

The end device may be further programmed to periodically connect to at least one other device to synchronize information. It may also be programmed to determine whether to execute the consumer care application itself, direct the back-end server system to execute the consumer care application, or direct a human care system to execute the consumer care application based on an escalation algorithm. The human care system may be a care system staffed by support personnel who may process and respond to consumer care needs. The escalation algorithm may be a set of ordered steps for processing consumer care that may include a step that moves the care processing to another tier of consumer care. The escalation algorithm may depend on a set of factors, which may include the set of context data, the consumer's preferences, the consumer's skill level, the processing power of the end device, and combinations thereof.

In another embodiment, the end device may be further programmed to identify a potential problem based on the consumer activity and alert the consumer of the potential problem. The consumer care application may provide a consumer care solution for the potential problem.

Other embodiments may provide a computer-readable medium encoded with computer executable instructions, for installation upon an end device comprising a computer memory. The computer-readable medium may configure the end device to monitor a consumer's activity, collect and store a set of context data that includes the consumer's activity, proactively offer the consumer the consumer care application based on the context data, and periodically connect to a back-end server system to synchronize information. The computer-readable medium may further configure the end device to execute the consumer care application in accordance with the consumer's instructions.

Yet other embodiments may provide a method for providing consumer care on an end device. The method may include the steps of monitoring at least one event on the end device, collecting and storing a set of context data regarding the event, and proactively offering the consumer at least one consumer care application based on the context data. The event may be related to consumer information, consumer activity, device information, device activity, resource usage, resource availability, device location, consumer location, and combinations thereof. The method may further include the step of executing the consumer care application and providing a consumer care solution on the end device. Alternatively, the method may include the steps of directing a back-end processing system to execute the consumer care application and connecting to the back-end processing system to receive a consumer care solution.

BRIEF DESCRIPTION OF THE DRAWINGS

While the invention is claimed in the concluding portions hereof, preferred embodiments are provided in the accompanying detailed description, which may be best understood in conjunction with the accompanying diagrams where like parts in each of the several diagrams are labeled with like numbers.

DETAILED DESCRIPTION OF THE EMBODIMENTS

Embodiments of this invention may utilize consumer devices (100) to provide eCare. Examples of such devices, include, but are not limited to, mobile phones, PDAs, PCs, set-top boxes, game consoles, cameras, stationary phones, etc. As the use of smart devices (100), especially mobile ones, becomes more ubiquitous, the number of interactions that end consumers have with them may increase. Devices (100) are a natural point for eCare interactions because they are an interface that the consumer is familiar with and may be the end point of a consumer transaction.

Figure 1:
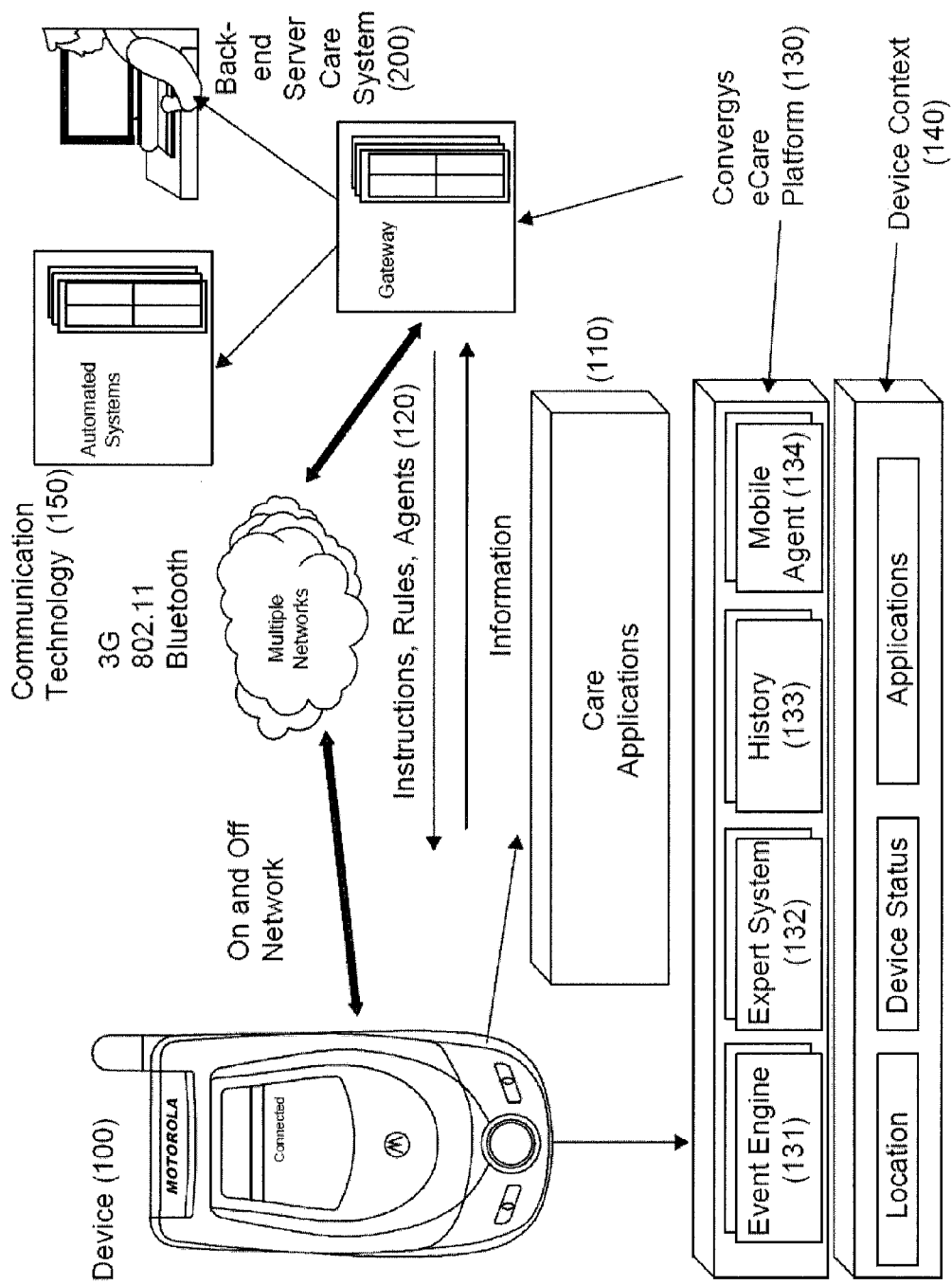
FIG. 1 illustrates a deployment for one embodiment of the system.

Referring to FIG. 1, the device (100) may be configured to communicate with a centralized back-end eCare system (200) through a wireless (e.g., Cellular, 802.11x, or Blue Tooth) or wired (e.g., Universal Series Bus (USB)) network connection (300). The device (100) may establish a connection to synchronize information between the two systems. The connection may comprise any network protocol, which may be any method of transferring data over a network, including, but not limited to, HTTP or HTTPs. Various configurable parameters may be specified within the eCare system. These parameters may allow the system to determine when a connection should be attempted, or when a connection is required. For example, the device (100) may be configured to establish a connection with a back-end system (200) at specified time intervals (e.g., every 24 hours).

A deployment of a device-based eCare system may have several features. Device hosted elements may include the device itself (100), specific eCare applications (110), and an eCare platform (130). The specific eCare applications may be balance applications, pricing applications, reactive applications, diagnostic applications, anticipatory applications, or combinations thereof. The eCare platform (130) may be a generic eCare platform (130) that may be used in a variety of situations. In computers, a platform may be the underlying computer system on which application programs can run. A platform comprises an operating system, the computer system's coordinating program, which in turn may be built on the instruction set for a processor or microprocessor. The operating system may be the hardware that performs logic operations and manages data movement in the computer. The operating system may be designed to work with the particular processor's set of instructions.

The platform (130) may include functional elements, such as an event engine (131), expert system (132), history (133), and mobile agent (134). The event engine (131) may include a mechanism for posting and receiving events that occur on the device (100). This may allow all of the parts of the platform (130) to react in a cooperative fashion with one another, as well as with external applications.

The expert system (132) may be any industry standard rule engine, such as, for example, CLIPS or Jess. The expert system (132) may encompass a mechanism for correlating events, generating business rules based on the events, and determining actions based on the business rules. The rules may be defined within the system, or may be downloaded into the expert system. This may enable the platform (130) to support rule-based behaviors based on events from the event engine (131). It may also allow for new behaviors to be downloaded to the device (100) without reprogramming the engine (131). The rules may be changed over time to reflect new business rules and/or scenarios.

The history (133) may comprise a data store of pertinent context information (140) received from the device (100) or the back-end system (200). This data may be used for trend analysis and as part of an expert system (132). For example, the expert system (132) may access and utilize data regarding how often it has seen a particular event in the past.

The mobile agent (134) may be a software module that moves from host to host in a network and incorporates a runtime space. The mobile agent (134) may use the event engine (131), expert system (132), and history (133) to diagnose, alert, answer questions, and recommend actions. The mobile agents may serve as the "active" part of the system. They may receive the notifications from the event engine (131) as well as the expert system (132). Further, they may have interfaces into the device (100) to effectuate changes, including, but not limited to, posting a dialog box, recording a record in history, making a network call for more information or extra processing, shutting down an application, etc.

The device (100) may comprise contextual information (140) that may be relevant for providing consumer eCare and may be provided to the eCare platform (130). The contextual information (140) may include: the location of the device, including, but not limited to, the physical location and network state; the status of the device, including, but not limited to, the state of the device including its memory allocations, battery, network interface, central processing unit capacity, and other running applications; and consumer information, including, but not limited to, end consumer history and consumer preferences, which may be eCare, device, and entity parameters that may be defined by the consumer.

A device's context (140) may further include entities such as device type details (e.g., handset types, feature sets), device configuration (e.g., memory, network, operating system), applications, history of events on the device, personal configuration preferences, connectivity (e.g., types of networks, general packet radio services (GPRS), wireless fidelity (WiFi), Blue Tooth), device consumer services, applications (e.g., protocol independent multicast (PIM), phone book, calendar usage), and commerce (e.g., purchase and usage of content). Contextual and environmental information (140) may be stored and updated on the device (100). The device (100) may include a specific database that may contain the context information (140), as well as an application programming interface (API) for storage and retrieval of context information.

The contextual information (140) on the device may also include profile information, including the consumer's skill level, the best time to contact the consumer, the best medium for contacting the consumer, and more. This may be useful where the service is provided by an eCare system on a back-end server (200).

The system may also comprise server hosted elements in some embodiments. Even though the system may execute on the device (100) and operate independent of a network, it may integrate and work with a back-end eCare system (200). This may allow for new rules and agents (120) to be deployed onto the device (100), as well as for the device hosted agents (120) to collaborate with either server-hosted automated systems (eCare and/or web sites) or with actual human agents. This collaboration may aid the diagnosis and recommendation cycle. Instructions (120) may be downloaded from the automated system or human agent and executed on the device (100) by the device-resident agent and information (120). Further, statistics for logging and agent training may be uploaded onto the device (100).

Current activity may drive the system's response. If the consumer is in the middle of a phone call or a game, then the system may wait until the consumer is finished to show a consumer eCare dialogue or response.

Embodiments of eCare solutions may be programmed to adapt according to the context of the scenario. For example, the system may respond to the consumer through the consumer's preferred channel of communication (i.e., e-mail, chat, web site, etc.). Likewise, embodiments may be programmed to adapt their response based on the information gathered in the context (140) to provide a system that closely aligns with a consumer's changing requirements. As the consumer gains experience and preferences are identified, the system may adapt its care to match the consumer's changing needs. If, for instance, the consumer is a novice, then the device (100) may change the consumer interface to be more task oriented and include wizards to guide the consumer. If, on the other hand, the consumer is an expert, then the system may provide a more detailed and less scripted interface. Embodiments may comprise variations of these aspects to facilitate a range of solutions to satisfy the needs of the consumer.

Embodiments of the system may monitor the consumer and system activities to build the context (140). The information gathered could be a static set of data points or a more dynamic set of data points as the solution moves up the adaptive axis. Adaptive embodiments may learn from the context information (140) gathered and alter the consumer eCare offerings based on what has been derived. These embodiments may rely on a growing set of contexts (140) to infer new information. Using this new knowledge, these systems may modify the context (140), gather new data points, drop inapplicable or outdated data points, and, ultimately, alter the eCare provided to the consumer.

A device-based eCare system may, for example, be adaptive to the level of care required. As an application or system becomes more familiar to a consumer, frequent assistance may change from an aid to a hindrance. Initially, consumers might have novice skill level. These consumers may frequently encounter areas of the application where assistance is necessary. However, as the understanding of the consumer expands, he or she may require less and less assistance. The system may adapt, in this case to the skill of the consumer, to provide an effective eCare solution. An eCare solution may monitor the activities of the consumer, as well as the consumer's response to prior assistance queues, to adapt when future assistance is proactively provided. These systems may aid when aid is needed, and may stay out of the way when experts are performing flawlessly. A device-based eCare solution may be adaptive to various consumers as well.

A consumer device (100) may host eCare applications both for the services deployed on the device as well as interface points for eCare concerning network services. An interface point may be any point of access to the network, including, for example, WiFi, Blue Tooth, cellular, or trusted computer internet protocol (TC/IP). History capture, pattern matching, and real time monitoring may be performed directly on the device (100). History capture may refer to recording events generated on the device (100), which may be referenced later as historical data. Pattern matching may refer to examining the event or history of events for a known sequence or pattern of events to infer relevant care information.

Real time monitoring may refer to capturing, processing, and responding to events immediately as they occur on the device. The device (100) may actively monitor a variety of events by using agents, rules, and/or instructions (120) on the device (100). The agents, rules, and/or instructions (120) may be downloaded onto the device (100) from the server. Further, the agents, rules, and/or instructions (120) are not fixed, but rather may be monitored and changed over time. The events monitored may be selected from a dynamic list of sources, including, but not limited to, consumer information, consumer activity, device information, device activity, resource usage, resource availability, device location, consumer location, and more. The system may, for example, monitor various device resources by intermittently evaluating the availability of the resources.

In addition, the events monitored may vary for each care application (110) within the eCare system. For an application (110) designed to send an alert when the consumer's account balance is low, the agents, rules, and/or instructions (120) may be configured to monitor consumer activity, device activity, and other events that effect the account balance. Alternatively, for an application (110) that forwards all of a consumer's messages to a desired location on one of a consumer's devices, the agents, rules, and/or instruction (120) may be configured to monitor only device activity and location information related to receiving and sending messages.

The system may monitor and profile consumer behavior on an individual and/or population (aggregate) basis. An individual profile may categorize a particular consumer based on, for example, tasks frequently performed, tasks not completed, tasks incorrectly performed, experience level, and more. The population profile may categorize consumers by a larger aggregate profile, such as a particular demographic, affinity group, or a group of service subscribers.

A monitoring API may allow applications (110) to post information regarding the status of events. Where events are stored may depend on the amount of storage available of the device (100) and the immediacy of the response required. The device (100) may retain any data required for the configured rules and store the data in a local repository for current and future analysis. The device (100) may summarize events before forwarding them, or alternatively, may send the events in their full form.

The device (100) may be configured to provide consumer eCare solutions in real time or near real time. Real time embodiments may process and respond to events immediately. Near real time embodiments may provide a response after a short period of time (i.e., seconds or minutes) when the response cannot be processed immediately for performance reasons. Real time or near real time consumer care solutions may be achieved by performing the consumer eCare solution directly on the device (100), where the consumer is having a problem. Embodiments may provide eCare even when the device (100) is disconnected from the network for example, through error or decision.

Embodiments may range from reactive, such as the consumer requesting assistance, to highly proactive, where the system intervenes to assist the consumer. A reactive embodiment may comprise a knowledge-based help solution. Reactive embodiments may require the consumer to initiate the eCare scenario. The consumer might ask the eCare system "How do I . . . " or "What is my . . . " type questions and the system may react based on those inquiries. The knowledge-based help function may be resident on the device (100). Knowledge-based, reactive embodiments may consume less processing power than proactive, problem resolution embodiments because the system may be configured to only download information that is considered potentially relevant.

A proactive embodiment may comprise a problem resolution solution. These systems may attempt to intervene at an appropriate moment to assist the consumer either directly, indirectly, or both. In a direct action, the system might prompt the consumer with hints to suggest a course of action when the system perceives that the consumer is misguided. Similarly, the system may alert the consumer when the consumer has exceeded an imposed limit. If, for instance, the consumer has used all of the allotted monthly minutes of his or her cellular phone plan, then the system may alert the consumer that he or she has no remaining plan minutes.

Embodiments may draw from both reactive and proactive quadrants as well. For instance, a knowledge-based solution may adapt by learning to enhance a solution by providing the consumer with additional information derived across all of the consumer's interactions.

Figure 2:
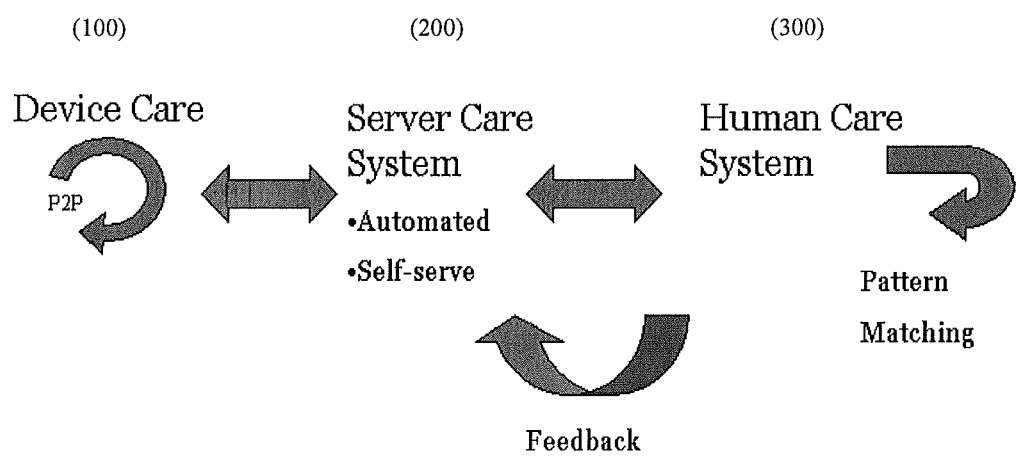
FIG. 2 illustrates a possible interaction between a three tier embodiment of an eCare system.

Referring to FIG. 2, embodiments may comprise three tiers of eCare. At the first tier, the device itself (100) may interact with the consumer and may provide the first tier of eCare. Additionally, the device (100) may be configured to collaborate with other devices in a peer-to-peer relationship to provide eCare across all of a particular consumer's devices. The consumer's experiences across their various devices may be collected and used in the monitoring and learning processes to gather understanding.

The second tier may comprise a back-end server eCare system (200) that collaborates with the device eCare solution (100). The server eCare system (200) can provide functionality for proactive device eCare solutions, as well as self-service capabilities for device eCare knowledge-based solutions. The back-end system (200) may monitor and learn based on information on the system or information uploaded from the device (100). The back-end system (200) may also range from reactive to proactive. The server eCare system (200) may also serve as a second line of eCare when the device eCare system (100) either cannot resolve the issue or defers to the server eCare system (200).

The final layer may comprise a human eCare system (300), which may be a care system staffed by support personnel who may process and respond to consumer care needs. These systems may interact with the back-end server eCare system (200) to resolve issues that have been escalated up the line. The human eCare system (300) may provide feedback to the server eCare system (200) based on the final resolution of a particular problem to assist the server eCare system (200) in resolving future issues.

Embodiments of the system may implement programmed tier escalation via an escalation algorithm, which may enable the planned transition from one channel of eCare to the next. The escalation algorithm may be a set of ordered steps for processing consumer care that may include a step that moves the care processing to another tier of consumer care. The escalation algorithm may depend on various factors, including, but not limited to, context data, consumer preferences, consumer skill level, the processing power of the device, and the costs of executing the applicable care application on each of the tiers available (i.e., the cost of executing the care application on the device (100), the cost of executing the care application on the back-end system (200), and the cost of executing the care application on a human care system (300)).

The programmed channel escalation may be implemented via a web-based forum, e-mail, text chat, callback, or an immediate live agent. The system may balance immediacy of problem resolution against the cost of the resolution. The programmed channel escalation may be modified and altered. Programmed channel escalation could include routing to the appropriate enterprise or live agent.

The programmed channel escalation could be adaptable to profiles, preferences, and/or manual overrides. The system may escalate whenever the current level of eCare is either explicitly indicated as insufficient or implicitly derived by the system to be inefficient. For example, a consumer may dismiss the eCare being offered and specifically request another type of eCare other than the current level being provided. In other scenarios, the system may determine that it does not have the business knowledge or processing power to determine the course of action and escalate the eCare processing to the next tier. The system may incorporate an escalation algorithm, which may determine when and to what level the escalation occurs based on a number of factors, including, but not limited to, the current context of the event, the consumer's preferences, the consumer's skill level, the processing power of the end device (100), the cost of executing the applicable care application on the end device (100), the cost of performing the care application on the back-end processing system (200), and the cost of performing the care application in the human care system (300).

A device-based eCare system may provide for enhanced consumer initiated help. For example, standard context-sensitive help could be provided. In addition, content could be updated and search indices could be updated based upon aggregate usage information. Further, the system may provide knowledge-driven "how do I . . . " help that focuses on providing help on higher-level tasks instead of the lower-level atomic tasks typically provided. For example, the task information in response to the question, "how do I configure my devices to be forwarded to my PC?" could be updated to provide new content based upon aggregate usage information.

The eCare solution could also provide consumer initiated inquiry capabilities to provide responses for a myriad of typical questions from a consumer regarding their devices (100), services, features, and accounts. The system could provide an ad hoc way of mining device history and other aspects of consumer history by allowing the consumer to select the types of information to extract from the history. The consumer may be able to obtain relevant historical information that could be used to make informed decisions. The system may, for example, provide answers to questions relating to plan/details, usage history, payment history, etc.

Systems of the present invention may further include a wizard-driven assistance application, which could provide a framework for conflict identification and resolution for services, features, and other known problem configurations. An embodiment may provide an adaptive version of these self-care wizards. The automated system could review the current device configuration—both on and off the device (100) and forward a model to help the consumer understand their current configuration. The system may also allow a consumer to review the knowledge base, which may generate a diagnosis either textually or graphically.

Further embodiments may utilize a device-based eCare system to anticipate eCare. Once a system or application breaks, down time and consumer frustration may build. After the system breaks, the consumer could employ reactive eCare to resolve the issue. A proactive eCare solution could monitor and react to situations that lead to problems before they occur. The eCare solution may offer alternatives to the consumer action to achieve the desired effect. Anticipatory eCare could provide insight into what the consumer is trying to accomplish (i.e. "we see you trying to do . . . ") to rescue a struggling consumer from eventual frustration. Further, by intervening during consumer interactions, the eCare solution could alert the consumer of the consequences of their intended action (e.g., "If you forward in this manner, all your calls will go to voice mail"). Use of voice enabled interfaces hosted on the device could provide alternate methods of interaction.

The solution may also include system and service diagnostic applications that may be run to analyze a current system or configuration to determine the root cause of a particular problem. These diagnostic applications may help the consumer and provider understand the cause of the problem, as well as determine the course of resolution. The system may be configured to provide a detailed explanation for a problem. For example, the system may provide the root cause—what actually caused the problem and how to avoid recurring states. The system may likewise offer a course of action or resolution—how to resolve the symptom (side effects) and the root cause itself. The system may provide assistance by taking actions to resolve the symptom, such as initiating a trouble ticket for the consumer. The solution may provide for consumer initiated and automated resolution.

Diagnostic applications, when paired with the capacity to monitor consumer behavior and application use, may be used to proactively look for potential problems and warn the consumer. Such anticipatory eCare applications (110) could improve consumer satisfaction and deflect problems from other more expensive eCare options. These applications could evaluate memory usage, network stack configuration, running applications, library versions, etc to determine potential error conditions.

eCare systems may further provide application specific eCare. If interfaces are provided to the eCare system, then a specific interface may be constructed directly for a particular application. The eCare system may be primed with rules and actions tailored specifically for an application. This may allow many applications (110) on the same device (100) to share a common runtime for eCare, thus reducing the need for each application to create, run, and manage their own eCare applications (110). This may reduce the time required to market an application, cut development time for applications, and save resources on the device.

In another embodiment, the system may provide completely automated case management. An eCare solution that is adaptive to the needs of care may understand that it may be unable to resolve a situation and may create a case to be worked by a live agent. To aid in the intelligent routing of the issue, the case may be populated with the context of the issue, which may include, among other information, interaction history, device configuration, statistics, and attempted eCare resolutions. The agent best suited to resolve the case may receive all of the necessary context to work the issue. These systems could schedule callbacks with the consumer via chat, e-mail, or live call.

For example, the consumer may identify that a particular feature or service is not working properly. The solution could then provide a mechanism to request assistance. The consumer could be given the opportunity to create a case number and, if the case number is created, then the relevant problem context could be gathered by agents (120) on the device (100) and forwarded to the back-end system (200). The solution could then follow a programmed channel escalation to route the created case to the first channel (100) (unless the escalation is overridden by a profile or preference).

Planned (programmed) interventions may be programmed for problem identification and resolution paths. These interventions could be triggered by the consumer, automated case management system, a live agent/enterprise, or a pattern matching engine. Seeded generic eCare plans across a range of populations could present an opportunity for the solution to experiment with different programmed (planned) problem resolutions. The solution could seed several variants out to the population to determine which resolution provides superior metrics, such as, for example, time, cost, survey feedback.

As the consumer interacts with a device enabled eCare system, the eCare system may provide mechanisms for event data collection. The collected data information may be leveraged through various analysis mechanisms by the eCare system to provide a more productive consumer experience. As the amount of event data increases, the device environment may become more adaptive to the consumer's modes of use. An eCare system may also provide consumer assistance based upon the consumer's knowledge of the device environment derived from collected data and/or consumer provided information.

Embodiments may collect information about what is occurring on the device. The system may monitor the consumer's activity and store context information in a storage facility or database. Entities in a device's environment (140) that are eCare enabled may generate event data that may be collected and leveraged by the eCare system with an ability to:

Observe—This may include the ability of the eCare system to collate events and note their implications on another event for possible future analysis, interaction, and/or adaptation. The system may, for example, analyze the log file and perceive that based on the consumer's usage pattern, the consumer will exhaust the account balance before the end of a certain period (i.e., month). This observation may trigger a prompt to the consumer to purchase additional amounts for the balance to prevent potential service interruptions.

Monitor—This may include the ability of the eCare system to continually watch data events as they occur and take action based on significant events of known information. For example, the eCare system may recognize when an account balance is debited and accept the event debiting the account balance.

Log—This may include the ability of the eCare system to collect data opaquely and store it for future uses, such as trend analysis on usage of items within the device environment. When, for instance, the system accepts an event, the system may log the event in a history file.

Observation and monitoring may occur on both the device (100) and the supporting back-end eCare system (200). Log information may be utilized by the device eCare infrastructure (100) and forwarded to the back-end eCare system (200) for a broader or more efficient analysis. For example, by keeping a log of consumer/system-initiated changes, the system may accelerate the time needed for resolution of a consumer problem because the eCare provider may not be required to rely upon the consumer's awareness or memory as to the source or the context of the problem.

The upload of log information (via synchronization with the back-end system (200)) may also help alleviate the need for consumers to initiate an eCare scenario from a secondary channel/device due to problems with their first channel/device (100). Since the device (100) is capable of actively monitoring and logging consumer activity, there may be an opportunity to proactively identify when consumers are 'lost' and accordingly, suggest a course of action.

When eCare data is gathered and analyzed on the device (100) and the back-end system (200), it may be used to proactively adapt the device's environment (140) and entities, including, but not limited to, user applications participating in the eCare scenario, to the consumer's derived and stated preferences. Derived preferences may be managed by the eCare system and may be based on the analyzed event data.

eCare event data collection and analysis may enable a set of core eCare capabilities that may be fundamental to its function. By analyzing the eCare event data, observations can be made that may result in the need to alert a consumer(s) to a potential problem or possibly an immediate problem. These alerts can occur in real time or near real time on the device (100) based on information resident on the device (100). For example, when a consumer's account balance is low and the consumer's usage pattern indicates that the consumer will exhaust the account balance before the end of the designated period (i.e., the month), the eCare system may prompt the consumer with an opportunity to purchase more units to prevent possible service interruptions.

Alerts may also be issued from the back-end server eCare system (200). The alerts issued from the back-end system (200) could be immediately available to the consumer or may be made available to the consumer if a particular scenario or action occurs when the consumer is using the device (100). For example, the back-end server (200) may issue an alert to prompt the user with an opportunity to purchase units to add to the consumer's account balance. The system may prompt the consumer immediately, or may wait and prompt the consumer when the consumer makes a transaction that consumes additional units from the account balance.

Aggregated eCare event data and the derived knowledge from the event data across one or more population groups with the same devices and environments may be used by the back-end eCare system (200) to solve some of the following issues:

Behavioral—What is the behavior of consumers? What is the behavior of consumers across a particular set of demographics? eCare knowledge can be used to identify good and bad consumer and entity interactions on the device. Knowing what works and what does not may be used to proactively help consumers via eCare active assistance or anticipatory eCare across demographic groups. It may also be used to show which services and features consumers are most interested in. For instance, the system may store and analyze when consumers use a particular service, whether they change any of the default settings to customize that service, and if so, which features are customized. The system may then be updated to reflect customer trends and preferences.

Service/Feature—What service and features are being used and how successfully are they being used across population and demo-graphic groups? eCare event data and knowledge may be used to find out service and feature usage information and active assistance or anticipatory eCare. The system may, for example, log when and how often a service is being used, such as network usage to share files.

Improper Consumer Self Diagnosis: How can an eCare system proactively prevent improper consumer feedback for a problem? For example, a consumer may believe that the device is working improperly and is inhibiting the consumer from sending e-mail. Yet, based on eCare cross population knowledge of a consumer's device type, the system may recognize that there are no identified e-mail problems. The on device system's knowledge of this may cause an examination of eCare event usage data. This may be used to identify how a consumer is attempting to use an on device entity, such as e-mail. When the eCare system recognizes consistent improper use of e-mail, an eCare wizard can be summoned to guide the consumer through the process of sending e-mail.

eCare systems may maintain device event history throughout the system for constant analysis and synthesis of eCare knowledge. The device (100) may contain a limited amount of historic information while a more comprehensive historical knowledge may be maintained on the eCare back-end system (200). Further synthesized eCare knowledge inferred from the historical eCare event data on the back-end system (200) may be propagated back out to the device (100). Historical eCare event data can answer questions in the following areas:

Service/Feature
    Which service and features are being used the most?
    When (time, day of week, holidays) and what service and features are being utilized?
    Which service and features are problematic?
    What types of problems are associated with these services and features?
    Consumer?
    Network?
    Hardware?
    Configuration?
Cross-device—The device-based eCare system may run across multiple-device types. An eCare system may examine the historical device event data and then derive and acquire knowledge to determine cross-device eCare trends.
Cross group—The device eCare system may enable an analysis of event data across diverse and/or provider defined demographics. eCare demographic data can be analyzed for eCare trends to particular consumer segments and enable proactive eCare enablement through such facilities as pre-emptive eCare, active assistance, and directed help.

In yet another embodiment, a device-based eCare system may be used to solve configuration issues. As systems grow in functionality, they may increase in complexity. Systems are typically tuned or configured to meet specific consumer requirements. In addition, the consumer may alter these configurations after the installation of the system to further customize their personal solution. As systems interact with one another, the complexity can grow exponentially as one system affects another. A change in one system can break a seemingly unrelated system. Consumers can run into issues such "I just upgraded and now nothing works".

The solution may save configuration data or offer custom configuration options. For instance, a "base mode" could provide the ability to restart the solution in a default mode without any services or features configured. A "default mode" could provide the ability to restart the solution in a default mode with services and features provisioned, but not configured. A "last known" function could provide the ability to restart the solution in a previous configuration or a specific configuration identified as good or working. Device-based eCare may provide eCare utilities to maintain and manage device-based configurations. Device-based eCare may offer some of the following eCare facilities:

Configuration Sanity—Device-based eCare may provide a minimal device-based operation configuration. Configuration sanity, difference, and profiles may be offered as an administrative capability that may be directly applied by the consumer of the device or invoked by a privileged application or the eCare system component to create an environment where the software and hardware remain operable. This may enable a provider to define a configuration that can override all other configurations and provide guaranteed minimal device operation.
Differences—Device-based eCare may and record changes in configurations and provide difference reports to monitor changes across configurations. eCare systems may be further configured to watch for configuration inconsistencies.
Profiles—Device-based eCare may provide the ability to deploy and update device-based configuration based on demographic information.

An eCare solution may review the current configuration on one or more devices to determine if they align with any known issues. The eCare solution may not understand the configuration itself, but comprehend the correlation between similar configurations and prior issues. The eCare system may request the application system to perform a sanity check against the configuration, or may pattern match the configuration against other configurations to recommend an action. The eCare solution may also refer the consumer back to a prior configuration or "safe-mode" configuration to resolve the issue.

Device-based eCare may provide a robust observation subsystem that leverages the acquisition of eCare event data, which may be utilized in real time, near real time, and historical contexts. Furthermore, the eCare event data may be used to derive eCare knowledge and may be further augmented with acquired knowledge to proactively provide eCare solutions such as adaptive eCare, anticipatory eCare and active assistance. The system may effectively fingerprint a consumer by monitoring the consumer's behavior. The system may identify which task a consumer is performing and observe when the consumer is deviating from the path required to perform that task. For example, when the consumer pulls down the "File" menu and then the "Save As" menu, the system may identify that the consumer is saving a document under a different name. The system may then provide hints or suggestions for the next steps in the process of completing this task.

Device-based eCare may also provide a robust data acquisition framework for capturing consumer experiences with a device (100) and interacting entities. The captured data may be raw information that may be utilized to derive knowledge concerning the consumer and device (100) experience. Furthermore, this data may be augmented by external acquired knowledge, which may refer to knowledge acquired from outside sources, such as the device manufacture or an application service provider. This information may be used to further create a more thorough eCare knowledge base.

As more eCare event data is acquired and more knowledge is derived, the eCare system may become smarter about the device environment and the abilities of the consumer using the device (100). The eCare system may begin to adapt to the consumer's needs. Such programmatic solutions are within the knowledge base of those skilled in the art. Additionally, the consumer may provide direct input to the eCare system to further supplement the eCare system's understanding of the consumer.

Embodiments of the system may optimize the consumer device (100) capabilities and experience and avoid service calls to the vendors' service support centers. The data collected on the device (100) may allow content providers to proactively address consumer support issues. Further, the content providers may use the data collected on the device (100) for marketing. The device-based eCare system may utilize the following areas to understand and adapt to the eCare needs of the consumer:

- Device Pattern Matching—Pattern matching may refer to query techniques used to locate eCare knowledge contained within the knowledge repository of a device. Device-based eCare may contain a local knowledge base that may be able to infer the eCare needs of the consumer by analyzing the following device activity:
    - Uploads—Type of content uploads, when uploading occurs (i.e., the time of day, day of week, time of year, such as holidays, school days, working week)
    - Downloads—Type of content downloads, when downloading occurs (i.e., time of day, day of week, time of year, such as holidays, school days, working week)
    - Population—Whether consumer activity on the device maps to any known demographics, and if so, take the appropriate eCare action based on the demographic profile.
- Population profile—The back-end eCare system may analyze eCare event data and synthesize knowledge on the distributed population base to determine eCare profiles for different segments of the population.
- Individual profile—On device eCare may analyze and synthesize knowledge and adapt to the consumer's eCare needs.
- Device profile—eCare device event data may be analyzed by the back-end eCare system and the device-based eCare system to adapt the device's functionality to the consumer's needs.
- Group profile—The eCare system may be able to understand group profiles. Group profiles may be profiles that identify groups of consumers such as a family, a company or an organization within a company. These profiles may be used by the eCare system to adapt to the eCare needs of a group.
- Interactive profile—An interactive profile may allow a consumer to directly interact with the eCare system to customize the eCare functionality to the requirements of the consumer.
- Profile Definition—This may allow eCare administrators to define different types of eCare profiles that may be utilized by the eCare system to enhance a consumer eCare experience.

There are many areas where a device-based eCare system could be employed. In a scenario where an on device electronic wallet is maintained, a device-based eCare system could provide inquiry data on current balances, pricing for goods and services. A device-based eCare system could also provide an overall journal of electronic payment activities.

eCare systems of the present invention may provide the consumer with a holistic view of all of the financial transactions performed on the device (100) across all of the various payment instruments available on the device (100), including, but not limited to, stored value accounts, debit accounts, credit accounts, as well as operator managed balances. An eCare system could provide a consumer a unified view of all of their financial transactions performed off of the device (100).

Other embodiments may utilize a device-based eCare system to implement cross-device capabilities. Consumers often have a set of devices that are used for a variety of purposes. Each device (100) may have an eCare solution, but without knowledge of the other devices, may be limited to the contexts that are created within the particular device (100) itself. These isolated contexts may contain important artifacts necessary to resolve issues that span across all of the consumer's devices (100). A hybrid solution may leverage the best of both the device eCare (100) and server eCare (200) intelligence by monitoring for patterns across the eCare enabled devices (100). The collective view of eCare may be updated on the devices (100) to allow the eCare systems on all of the devices (100) to benefit from externally created contexts. For example, on the primary device (100), the consumer may have achieved an expert status. The system may be configured to share this status with the secondary devices so that they can adapt to the new consumer status. Additionally, these cross-device perspectives may allow the eCare solution to identify population wide issues and resolutions. The monitoring and synchronizing with the back-end system (200) or across a particular consumer's devices may further assist in cross-device problem determination and resolution.

The system may provide the consumer or service provider with a cross-device view of financial activity. If, for example, the consumer has multiple devices, then the back-end system (200) may maintain data for the consumer's financial transactions across all of the consumer's devices. When a particular device (100) is connected to the back-end system (200), the consumer may be able to collectively view his or her financial transactions across all of the consumer's devices on that particular device (100). Similarly, if the back-end server eCare system (200) maintains data for all of a consumer's financial transactions made on the device (100) and off of the device (100), then the system may have the capability to display information regarding all of the financial transactions on a particular device (100) when that device (100) is connected to the back-end system (200).

In other embodiments, the system may provide the consumer or service provider with a cross-device view of financial activity when the device (100) is connected to another device (100). One consumer device (100) may establish a connection with another consumer device via a communications technology (150), which may allow the consumer to view data related to transactions that have occurred on both devices. The device (100) may further have the capability to connect and synchronize with multiple devices at the same time.

The device-based eCare system may reside in a complex environment of hardware and software. The hardware and software configurations may evolve based on the consumer services needs and preferences. A service provider may also add or delete service and features, which may affect hardware and software configurations.

Figure 3A:
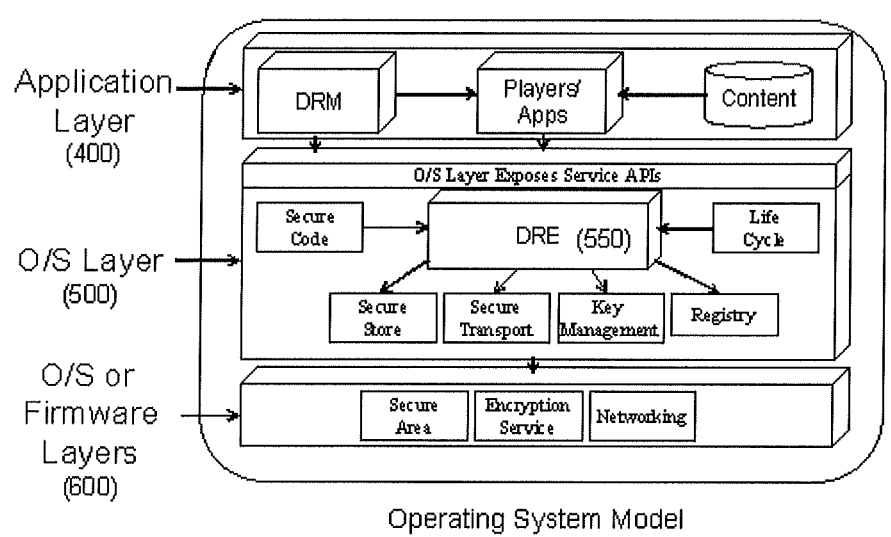
FIGS. 3A-C illustrate various configurations for architectural embodiments of the invention.
Figure 3B:
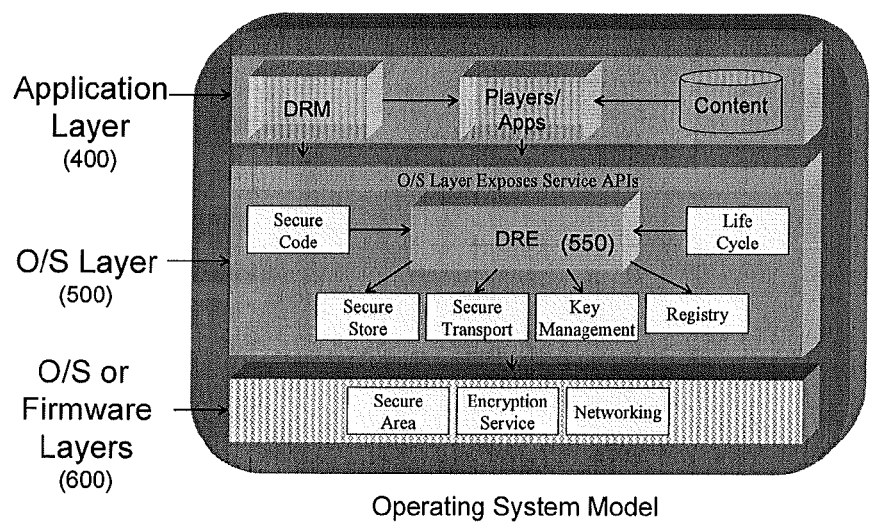
Figure 3C:
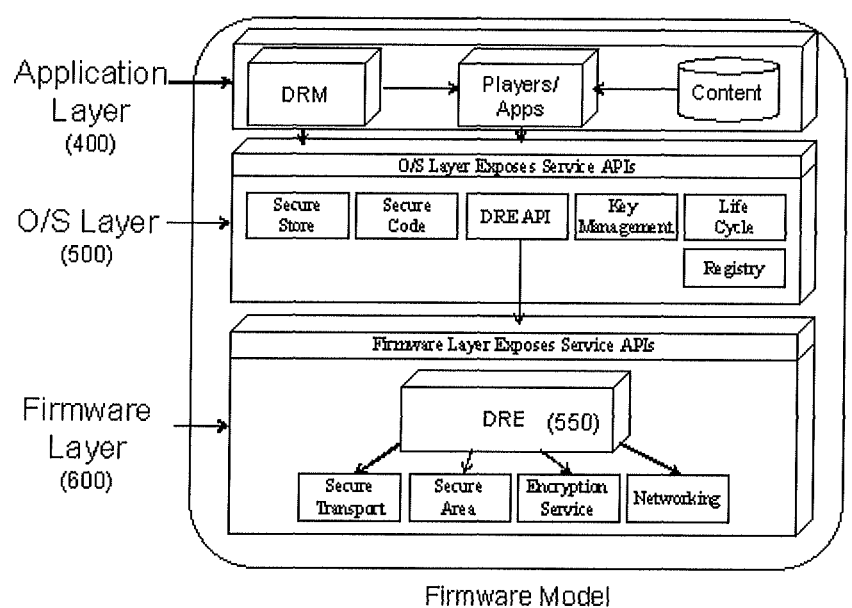

Referring to FIGS. 3A-C, in another embodiment, the eCare system may be integrated with or incorporated into a device based rating engine (DRE) (550) as described in United States Published Application No 2003-0187794, Irwin et al., published on Oct. 3, 2003 and hereby incorporated by reference. Each subscriber may have a consumer interface connected to their device (100), which may include a DRE (550) that allows the consumer to query the device (100) for information relating to their account (usage, charges, etc.). As events occur, events are priced, and balances are adjusted, the DRE (550) may maintain a running log of such transactions. These logs may record various attributes of the event processing (data, time, location, etc.). These logs may be transferred to back-end systems (200) for long-term storage and balance reconciliation. The policy for such interactions may be configurable.

Because the DRE (550) may have the capabilities to rate and maintain the balance on the device (100), the eCare system may work even when the device (100) is not connected to a network. The information may be up-to-date and available in real-time or near real time, and may not require mediation by a central system or access by a consumer service representative. This may offer significant reductions in the number of call center representatives as well as some automated systems (IVR, Web Self Care) because the processing and access may be performed on the device (100) itself. Further, the consumer may have immediate access to usage information because content and service transactions may be rated in real-time on the DRE (550). For enterprise subscription payment or immediate transaction/service payments, the DRE (550) may perform immediate payment debits from the DRE account balances.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A system for providing computerized consumer care, comprising:
   a back-end system; and
   an end device comprising:
      an event engine configured to:
         monitor, a consumer's activity; and
         collect, and store in a history a set of context data comprising data related to the consumer's activity, wherein the context data comprises profile information associated with the end device based on usage of the end device by a user;
      an expert system configured to:
         determine, a pattern of usage of the end device relative to an account associated with the consumer for the end device based on the set of context data; and
         determine, a future problem based on the pattern of usage of the end device relative to the account associated with the consumer and a usage by one or more other end devices associated with the account; and
      a mobile agent configured to:
         proactively offer the consumer, a balance or pricing application based on the set of context data and the determined future problem;
         determine, based on an escalation algorithm of the expert system, whether to proceed by making a choice between actions from a set of actions comprising:
            executing, the balance or pricing application without connecting to the back-end system or a human care system;
            directing, the back-end system to execute at least one consumer care software application; and
            directing, a human care system to execute the at least one consumer care software application; and
         adapt the balance or pricing application or the escalation algorithm based on the profile information.

2. The system of claim 1, wherein directing the back-end system to execute the at least one consumer care software application comprises executing the mobile agent to interact with a web site hosted by the back-end system.

3. The system of claim 1, wherein directing the back-end system to execute the at least one consumer care software application comprises directing the back-end system to execute a knowledge based help application.

4. The system of claim 3, wherein the end device is further programmed to display information provided by the back end system.

5. A system for providing computerized consumer care comprising:
   a back end system; and
   an end device comprising:
      an event engine configured to:
         monitor, a consumer's activity; and
         collect, using the event engine, and store in a history a set of context data comprising data related to the consumer's activity;
      an expert system configured to:
         determine, a pattern of usage of the end device relative to an account associated with the consumer for the end device based on the set of context data;
         determine, a potential future problem based on the pattern of usage of the end device relative to the account associated with the consumer; and
      a mobile agent configured to:
         proactively offer the consumer, a balance or pricing application based on the determined potential future problem; and
         determine, using the expert system and based on the set of context data and the determined potential future problem, whether to provide care by escalating to the back end system.

6. The system of claim 5, wherein the back-end system is a trouble ticketing system.

7. The system of claim 6, wherein the back-end system is configured to open a case.

8. The system of claim 5, wherein escalating to the back end system comprises downloading additional rules for the expert system from the back end system.

9. The system of claim 5, wherein escalating to the back end system comprises sending data to the back end system indicative of when the back end system should contact the consumer to provide care.

10. The system of claim 5, wherein the back end system is configured to provide care by diagnosing a problem on the end device based on data collected from the end device, in combination with data collected from a plurality of other end devices.

11. The system of claim 1, further comprising:
   the human care system, wherein the human care system is configured to permit interaction with the back-end system to resolve issues.

\* \* \* \* \*